United States Patent
Murray et al.

(10) Patent No.: US 9,600,738 B2
(45) Date of Patent: Mar. 21, 2017

(54) DISCRIMINATIVE EMBEDDING OF LOCAL COLOR NAMES FOR OBJECT RETRIEVAL AND CLASSIFICATION

(71) Applicant: Xerox Corporation, Norwalk, CT (US)

(72) Inventors: Naila Murray, Grenoble (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 49 days.

(21) Appl. No.: 14/680,490

(22) Filed: Apr. 7, 2015

(65) Prior Publication Data
US 2016/0300118 A1 Oct. 13, 2016

(51) Int. Cl.
G06K 9/00 (2006.01)
G06K 9/46 (2006.01)
G06K 9/62 (2006.01)
G06K 9/52 (2006.01)

(52) U.S. Cl.
CPC .......... G06K 9/4652 (2013.01); G06K 9/52 (2013.01); G06K 9/6215 (2013.01)

(58) Field of Classification Search
None
See application file for complete search history.

(56) References Cited

U.S. PATENT DOCUMENTS

| 7,062,083 B2 * | 6/2006 | Lim ............... G06F 17/3025 382/164 |
| 8,355,539 B2 * | 1/2013 | Tan ............... G06K 9/00798 382/100 |
| 9,075,824 B2 * | 7/2015 | Gordo ............. G06F 17/30247 |
| 2003/0021481 A1 | 1/2003 | Kasutani |
| 2007/0005356 A1 | 1/2007 | Perronnin |
| 2007/0258648 A1 | 11/2007 | Perronnin |
| 2008/0069456 A1 | 3/2008 | Perronnin |
| 2008/0240572 A1 | 10/2008 | Hoshii |
| 2008/0317358 A1 | 12/2008 | Bressan et al. |

(Continued)

OTHER PUBLICATIONS

Boureau, et al., "A theoretical analysis of feature pooling in visual recognition," ICML 2010.*

(Continued)

*Primary Examiner* — Feng Niu
(74) *Attorney, Agent, or Firm* — Fay Sharpe LLP (57) ABSTRACT

A system and method enable similarity measures to be computed between pairs of images and between a color name and an image in a common feature space. Reference image representations are generated by embedding color name descriptors for each reference image in the common feature space. Color name representations for different color names are generated by embedding synthesized color name descriptors in the common feature space. For a query including a color name, a similarity is computed between its color name representation and one or more of the reference image representations. For a query which includes a query image, a similarity is computed between a representation of the query image and one or more of reference image representations. The method also enables combined queries which include both a query image and a color name to be performed. One or more retrieved reference images, or information based thereon, is then output.

21 Claims, 7 Drawing Sheets

(56) References Cited

U.S. PATENT DOCUMENTS

| | | | |
|---|---|---|---|
| 2009/0067675 A1* | 3/2009 | Tan | G06K 9/00798 382/104 |
| 2009/0144033 A1 | 6/2009 | Liu et al. | |
| 2009/0208118 A1 | 8/2009 | Csurka | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |
| 2011/0091105 A1 | 4/2011 | Perronnin | |
| 2011/0137898 A1 | 6/2011 | Gordo et al. | |
| 2011/0184950 A1 | 7/2011 | Skaff et al. | |
| 2012/0045134 A1 | 2/2012 | Perronnin et al. | |
| 2012/0076401 A1 | 3/2012 | Sanchez et al. | |
| 2012/0143853 A1 | 6/2012 | Gordo et al. | |
| 2012/0158739 A1 | 6/2012 | Ah-Pine et al. | |
| 2012/0163715 A1 | 6/2012 | Murray et al. | |
| 2013/0159292 A1 | 6/2013 | Larlus et al. | |
| 2013/0290222 A1* | 10/2013 | Gordo | G06F 17/30247 706/12 |
| 2014/0229160 A1 | 8/2014 | Gallé | |
| 2014/0270350 A1 | 9/2014 | Rodriguez-Serrano et al. | |

OTHER PUBLICATIONS

Wang et al., "Personal Clothing Retrieval on Photo Collections by Color and Attributes", Multimedia, IEEE Transactions on, on pp. 2035-2045 vol. 15, Issue: 8, Dec. 2013.*
Jarrar et al., "On the use of conceptual information in a concept-based image indexing and retrieval framework", Image Processing (ICIP), 2011 18th IEEE International Conference on, on pp. 2441-2444.*
U.S. Appl. No. 14/141,612, filed Dec. 27, 2013, Murray, et al.
U.S. Appl. No. 14/557,677, filed Dec. 2, 2014, Sulc, et al.
U.S. Appl. No. 14/303,809, filed Jun. 13, 2014, Wu, et al.
Berlin, B., et al, "Basic color terms: their universality and evolution," Berkeley, University of California, pp. 245-248 (1969).
Clinchant, Stephane, et al., "XRCE participation to ImageEval," ImageEval Workshop at CVIR, pp. 1-8 (2007).
Gijsenij, Arjan, et al., "Computational color constancy: Survey and experiments," IEEE TIP, 20(9), pp. 2475-2489 (2011).
Jégou, Hervé et al., "On the burstiness of visual elements," CVPR, pp. 1169-1176, (2009).
Kang, Hang-Bong, "Affective content detection using HMMs," Proc. 11$^{th}$ ACM Int'l Conf. on Multimedia (MM '03), pp. 259-262 (2003).
Khan, Fahad Shahbaz et al., "Color attributes for object detection," CVPR, pp. 3306-3313 (2012).
Khan, Rahat, et al., "Discriminative color descriptors," CVPR, pp. 2866-2873 (2013).
Liu, Ying et al., "Region-based image retrieval with high-level semantic color names," Proc. 11th Int'l Multimedia Modeling Conf. (MMM 2005), pp. 180-187 (2005).
Lowe, D.G., "Object recognition from local scale-invariant features," ICCV, vol. 2, pp. 1150-1157 (1999).
Murray, Naila et al., "Generalized Max Pooling," CVPR, pp. 2473-2480 (2014).
Perronnin, Florent C., et al., "Fisher kernels on visual vocabularies for image categorization" in CVPR, pp. 1-8 (2007).
Perronnin, Florent C., et al., "Improving the fisher kernel for large-scale image classification," Proc. 11$^{th}$ European Conference on Computer Vision (ECCV): Part IV, pp. 143-156 (2010).
Qamra, Arun, et al., "Enhanced perceptual distance functions and indexing for image replica recognition," IEEE TPAMI, 27(3), pp. 1-35 (2005).
Sánchez, Jorge et al., "Image classification with the Fisher vector: Theory and practice," IJCV, 105(3), pp. 222-245 (2013).
Sánchez, Jorge et al., "High-dimensional signature compression for large-scale image classification," CVPR 2011, pp. 1665-1672 (2011).
Van De Weijer, Joost et al., "Learning color names for real-world applications," IEEE Trans. on Image Processing, 18(7), pp. 1-24 (2009).
Vaquero, Daniel, et al., "Attribute-based people search in surveillance environments," IEEE WACV, pp. 1-8 (2009).
Vazquez-Corral, Javier, et al., "Color constancy by category correlation," IEEE TIP, 21(4), pp. 1997-2007 (2012).
Wah, C. et al. "The Caltech-UCSD Birds-200-2011 Dataset," Technical report, CalTech, pp. 1-8 (2011).

* cited by examiner

DISCRIMINATIVE EMBEDDING OF LOCAL COLOR NAMES FOR OBJECT RETRIEVAL AND CLASSIFICATION

BACKGROUND

The exemplary embodiment relates to object identification in images. It finds particular application in connection with retail product retrieval in images.

For many applications it is desirable to be able to recognize specific objects in a photographic image or video. For example, given an image and a predefined set of objects or categories, the aim is to output all instances of the specific object or category of objects. However, object detection is a challenging task, due to the variety of imaging conditions (e.g., viewpoints, environments, and lighting conditions). Retail products, such as shampoos, laundry detergents, cereal packets, and the like in images are particularly difficult to distinguish based on texture and shape alone, since similar but slightly different products are often differentiated by differences in color. For example, a laundry detergent with one scent may include a predominant purple colored area while a similar detergent with a different scent may include a predominant green colored area. The color differences allow consumers to identify similar products while being able to distinguish between different varieties. However, these differences have not been easy to exploit in product identification in images.

Some studies have been undertaken which use color names or color attributes for object retrieval or image classification. For example, object retrieval has been performed by region matching, and by describing a region of an image using one of ten color names, where a color name is assigned to a region according its mean RGB value. See, Liu, et al., "Region-based image retrieval with high-level semantic color names," Proc. 11$^{th}$ Int'l Multimedia Modelling Conf. (MMM 2005), pp. 180-187 (2005). In a similar approach, regions of an image are assigned a dominant color, by assigning each pixel in a region to one of eight color names and assigning the region the name of the most common color. See Vaquero, et al., "Attribute-based people search in surveillance environments," *IEEE WACV*, pp. 1-8 (2009). Color names have been used for object detection by extracting, from an image window, a color template as a grid containing color name distributions in each cell. These templates were used to train window classification models. See Khan, Fahad Shahbaz et al., "Color attributes for object detection," *CVPR*, pp. 3306-3313 (2012). In another approach, learned color attributes, rather than color names, are used to describe local patches for image classification. See Khan, et al., "Discriminative color descriptors," *CVPR*, pp. 2866-2873 (2013).

However, such embeddings do not work for image-based queries because the concepts to be recognized (the products) are of a very high level. To compute similarity between images, the images to be compared are often embedded in a feature space by extraction of local descriptors, such as SIFT descriptors. See Lowe, D. G., "Object recognition from local scale-invariant features," *ICCV*, vol. 2, pp. 1150-1157 (1999). Fisher vectors are often used to embed these local descriptors into a higher-dimensional space. An aggregation and normalization of the embedded descriptors is used to generate an overall representation of the image. This provides a sophisticated and discriminative embedding for images. However, because of the differences between color name-based and texture-based image representations, the two approaches are not readily combinable for querying.

The exemplary embodiment allows both color name information and image texture information to be used jointly for object retrieval or object classification by embedding representations in a joint high-dimensional and discriminative feature space.

INCORPORATION BY REFERENCE

The following references, the disclosures of which are incorporated herein in their entireties, by reference, are mentioned:

U.S. application Ser. No. 14/557,677, filed Dec. 2, 2014, entitled SYSTEM AND METHOD FOR PRODUCT IDENTIFICATION, by Milan Sul, et al.

U.S. application Ser. No. 14/141,612, filed Dec. 27, 2013, entitled WEIGHTING SCHEME FOR POOLING IMAGE DESCRIPTORS, by Naila Murray, et al.

U.S. application Ser. No. 14/303,809, filed Jun. 13, 2014, entitled STORE SHELF IMAGING SYSTEM, by Wencheng Wu; et al.

BRIEF DESCRIPTION

In accordance with one aspect of the exemplary embodiment, a method for retrieval includes, for each of at least one reference image, providing a reference image representation which has been generated by embedding color name descriptors for the reference image in a feature space. For each of at least one color name in a set of color names, providing a color name representation which has been generated by embedding a synthesized color name descriptor in the same feature space as the embedded color name descriptors of the reference image(s). Provision is made for receiving a query comprising at least one of a color name selected from the set of color names, and a query image. For a query which includes a color name, the respective color name representation is retrieved. For a query which includes a query image, a query image representation is provided which has been generated by embedding color name descriptors for the query image in the feature space. A similarity is computed between the reference image representation(s) and the retrieved color name representation and/or the query image representation. Information based on the computed similarity is output.

One or more of the steps of the method may be performed with a processor.

In accordance with another aspect of the exemplary embodiment, a system includes an image representation generation component which generates representations of images by embedding color name descriptors for the image in a feature space. Memory stores a color name representation for each of a set of color names, generated by embedding a synthesized color name descriptor in the same feature space into which the images are embedded. A comparison component receives a query comprising at least one of a query image and one of the set of color names and computes a similarity between the query and at least one reference image in which the at least one reference image and the at least one of a query image and the one of the set of color names are each embedded in the same feature space. An output component outputs information based on the computed similarity. A processor implements the image representation generation component, the comparison component, and the output component.

In accordance with another aspect of the exemplary embodiment, a method for generating a system for comparing images and color names in a common feature space includes, for each of a set of color names, generating a color name representation. This includes synthesizing a local color name descriptor and generating a color name representation by embedding the synthesized local color name descriptor in a multidimensional feature space with a first embedding function. For each of a set of reference images, a reference image representation is generated. This includes assigning to each of a set of pixels of the reference image, a probability distribution over a predefined set of color names. For each of a plurality of patches of the reference image, a local color name descriptor is generated by aggregating the pixel probability distributions. An embedded patch descriptor is generated by embedding the local color name descriptor in the same multidimensional feature space with a second embedding function. The embedded patch descriptors are aggregated to generate the reference image representation. As a result, when a query is received by the system which includes at least one of a color name selected from the set of color names and a query image, a comparison between the query and the reference images is able to be computed in the same feature space.

At least one of the generating of the color name representations and the generating of the reference image representations may be performed with a processor.

BRIEF DESCRIPTION OF THE DRAWINGS

FIG. 2, which is split into

DETAILED DESCRIPTION

Aspects of the exemplary embodiment relate to a system and method for representing objects and color names in a common feature space which allows detection of instances of specific objects in images, such as still photographs and videos. The system and method operate by embedding images and color names in the same feature space. The color names are used to provide a compact representation of the color information in a local image patch.

While the exemplary objects are described as being commercial products, such as grocery items, clothing, and vehicles, it is to be appreciated that the method is also applicable to other objects, such as people and animals.

The exemplary method enables different types of queries to be performed, depending on the application. The exemplary system and method are particularly suited to distinguishing retail products that are difficult to distinguish based on texture and shape alone. Adding color information provides a method by which the products are more easily recognized. For example, given an image of a store shelf, the method allows detecting whether a given product is present on the shelf or not. In another embodiment, given a database containing a set of reference images of products available in a retail store, the method allows searching for the most similar products to a given query product.

In the exemplary embodiment, color names are used to encode color information. Color names have recently been used with success in image classification and object detection problems and have the advantage of being compact, discriminative and human-interpretable. To embed images, color names are used to encode patch-level information. The resulting local color descriptors can then be mapped into a higher-dimensional space using a non-linear function. The patch-level statistics generated can be subsequently aggregated and normalized. To embed color names, a local descriptor that corresponds to the query color name is synthesized. The local descriptor is subsequently mapped to the common feature space and normalized as for the patch descriptor, but with no aggregation process. Quantitative and qualitative evaluations demonstrate the effectiveness of the color features on a variety of fine-grained retrieval tasks.

Figure 1:
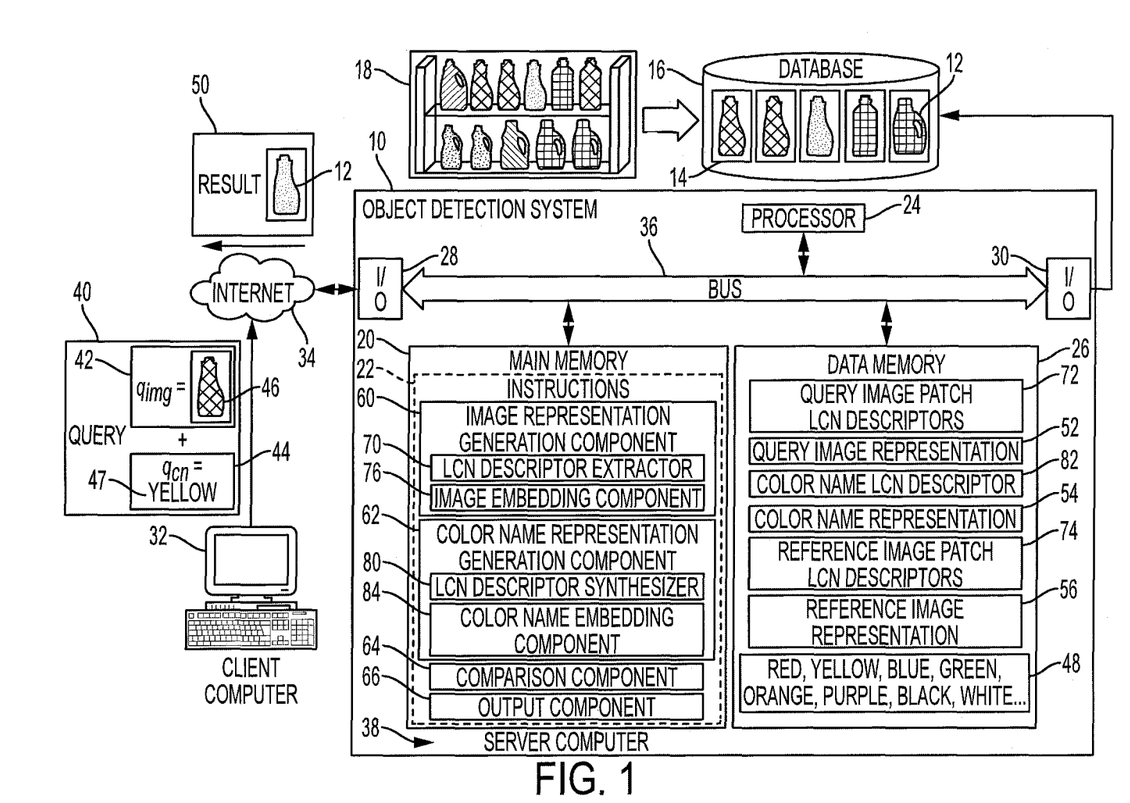
FIG. 1 is a functional block diagram of a system for representing objects and color names in a common feature space.

With reference to FIG. 1, a computer-implemented system 10 for object detection which facilitates detecting instances of objects 12 that appear in color photographic images (reference images) 14 is shown. The reference images may be stored in a local or remote database 16 that is accessible to the system 10. Each reference image 14 may include a single instance of an object 12, such as a retail product.

In some embodiments, the reference images 14 may be extracted from/located in a multi-object image 18 that includes multiple objects, for example, displayed on a product display unit, such as a store shelf unit of a product facility, such as a retail store, distribution warehouse, or the like. Many such images may be captured, for example, for covering an entire shelf or all or part of a store. In the case of images showing multiple objects, image regions containing the individual objects 12 may be extracted, e.g., using the method described in U.S. application Ser. No. 14/557, 677, by identifying bounding boxes which have a probability of containing an object. Each of these extracted regions may then be treated as a reference image 14. In other embodiments, the reference images 14 may be generated by capturing an image of each object individually.

The system includes main memory 20 which stores instructions 22 for performing the method described with reference to FIG. 2. A processor device 24, in communication with the memory, executes the instructions 22. Data memory 26 stores information generated and/or used by the system. One or input/output devices 28, 30, allow the system to communicate with external devices, such as the illustrated client device 32, via wired or wireless connections 34, such as the Internet. Hardware components 20, 24, 26, 28, 30 of the system 10 communicate via data control bus 36. The system 10 may be hosted by one or more computing devices, such as the illustrated server computer 38.

To search for products in a shelf image 18 or in a database of reference images 14, different types of querying mechanisms may be provided. As examples, the system may permit querying-by-example (QBE) and/or or querying-by-color-name (QBCN). In the QBE case, the system is provided with an image of a product and returns the images corresponding to the same product or to the most similar products. In the QBCN case, the system is provided with a color name (or a list of color names) from a predefined set and returns the images of products that display the queried color(s). In a combined query, the query includes both a QBE and QBCN component. QBCN is especially useful in the retail context, where color information may be the most efficient way to distinguish between different variations of the same broad class of products.

The illustrated system 10 receives as input a query 40 which includes at least one of an image query 42 (for performing QBE) and a color name query 44 (for QBCN). The image query 42 includes an image 46 of a product or other object. This may be a reference image—a standardized shot of the facing of a product. The color name query 44 includes at least one color name 47 selected from a predefined limited set 48 of color names. A combined query 40 includes both an image query 46 and a color name query 44. For example, as illustrated in FIG. 1, a combined query enables retrieving results 50 that include objects 12 which look like the query image product 46 but which are a specified color 47, e.g., yellow.

The exemplary system allows QBE and QBCN to be addressed with the same framework by embedding the query components 42, 44 and the reference images 14 in the same feature space and then comparing the resulting representations 52, 54, 56 in this space using a similarity metric, such as the Euclidean distance. The same type of embedding function is used for QBE and QBCN. For example, a first embedding function for embedding color names and a second embedding function for embedding images can be Fisher Vector embedding functions. This simplifies the design of the system and enables seamlessly transitioning from one type of query to another as well as combining the different queries in the embedded space.

The exemplary instructions include an image representation generation component 60, for generating query image representations 52 and reference image representations 56, a color name representation generation component 62, for generating color name representations 50, a comparison component 64 for comparing the query image representation 52 and/or color name representation 54 with one or more reference image representations 56, and an output component 66 which, based on the computed comparison measure, outputs a result 50 which includes one or more similar reference images 12, or information based thereon.

Figure 3:
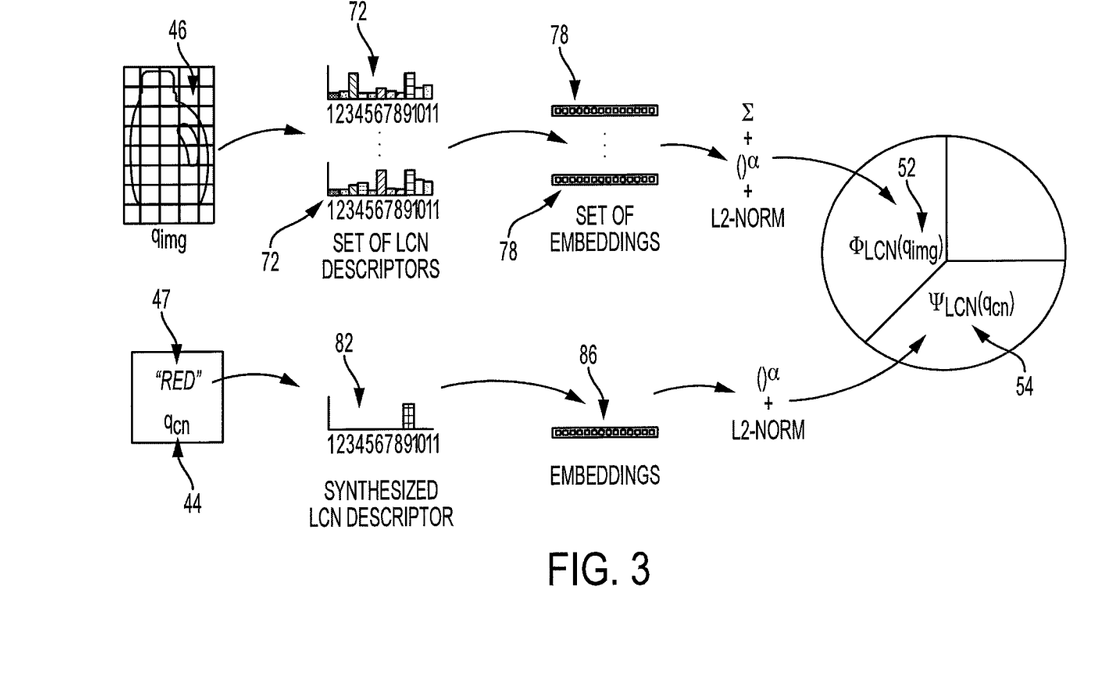
FIG. 3 graphically illustrates generation of image and color name representations.

The image representation generation component 60 includes a local color name (LCN) descriptor extraction component 70 which generates a set of patch-level LCN descriptors 72, 74 for each of the reference images 12 and similarly for the query image 46, as schematically illustrated in FIG. 3. An image embedding component 76 embeds the patch-level LCN descriptors 72, 74 in a higher-dimensional, common feature space using the second embedding function to generate a set of embedded patch descriptors 78 (FIG. 3). These are aggregated and power and/or L2 normalized to generate the respective image representations 52, 56.

The color name representation generation component 62 includes an LCN descriptor synthesizer 80 which generates LCN descriptors 82 for each of the color names 47 in the set 48 of color names which can be used in the color name query 44. A color name embedding component 84 embeds the LCN descriptors 82 in the same multidimensional feature space as the images, using the first embedding function to generate an embedded color name descriptor 86 for each color (FIG. 3) in the common feature space. The embedded color name descriptor 86 may be power and/or L2 normalized in the same manner as for the aggregated embedded patch descriptors 78 to generate a respective color name representation 54 for each color name. The color name representations 54 each have the same number of dimensions, which is the same as the number of dimensions as the image representations. Each color name representation 54 is then indexed by its respective color name 44 and stored in memory 26.

The computer system 10 may include one or more computing devices 60, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 20, 26, which may be separate or combined, may represent any type of non-transitory computer readable medium such as random access memory (RAM), read only memory (ROM), magnetic disk or tape, optical disk, flash memory, or holographic memory. In one embodiment, the memory 20, 26 comprises a combination of random access memory and read only memory. In some embodiments, the processor 24 and memory 20 and/or 26 may be combined in a single chip. Memory 20 stores instructions for performing the exemplary method. Memory 26 stores the processed data. As will be appreciated, part or all of data memory may be located on a different computing or memory storage device from the instructions 22.

The network interface 28, 30 allows the computer to communicate with other devices via a wired or wireless link 34, e.g., a computer network, such as a local area network (LAN) or wide area network (WAN), or the internet, and may comprise a modulator/demodulator (MODEM), a router, a cable, and and/or Ethernet port.

The digital processor 24 can be variously embodied, such as by a single-core processor, a dual-core processor (or more generally by a multiple-core processor), a digital processor and cooperating math coprocessor, a digital controller, or the like. The digital processor 24, in addition to controlling the operation of the computer 38, executes instructions stored in memory 20 for performing the method outlined in FIGS. 2 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2A:
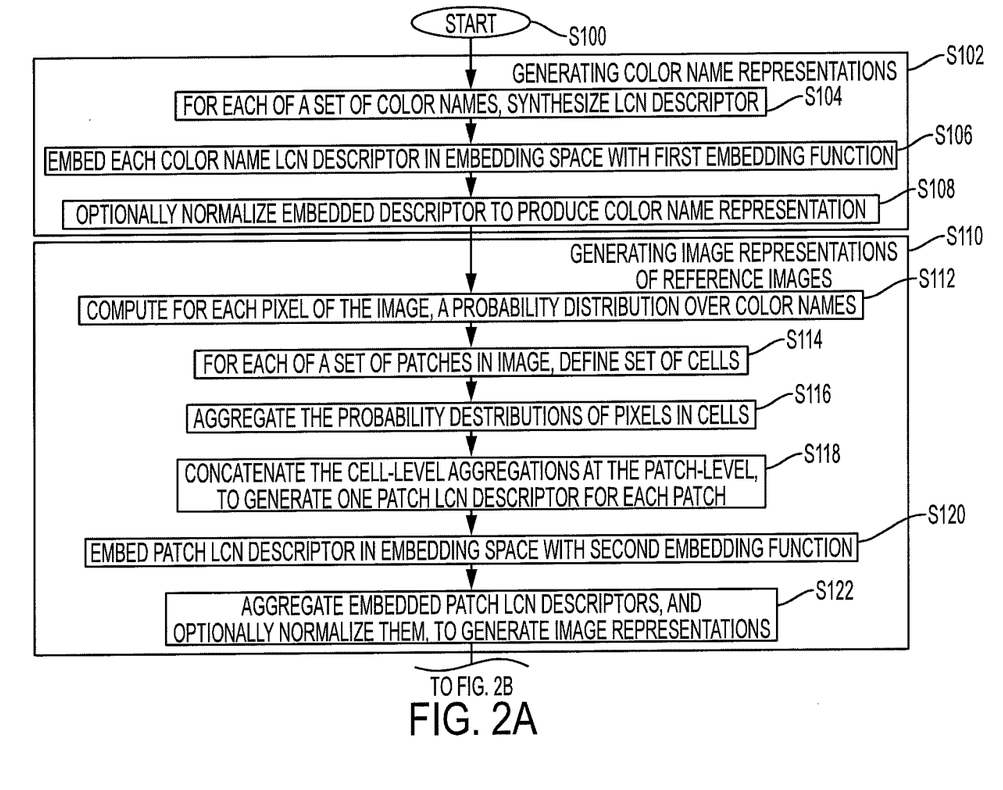
FIGS. 2A and 2B, illustrates a method for representing objects and color names in a common feature space and for detection of objects based on the representations.
Figure 2B:
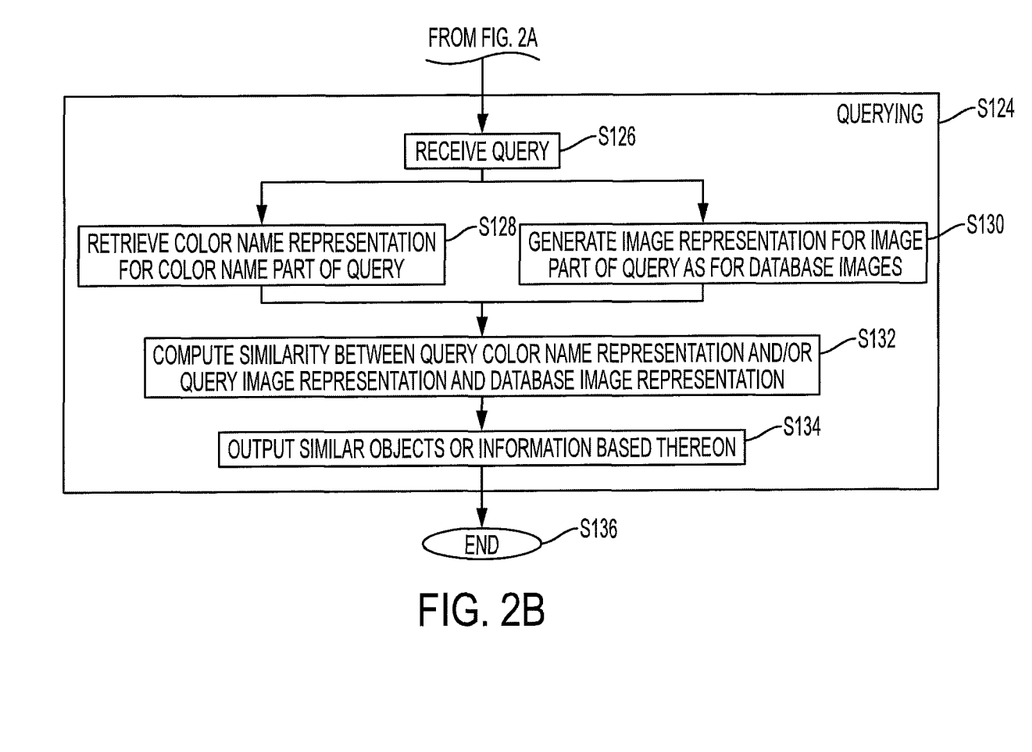

With reference now to FIG. 2, a method for using a predefined set of color names for generating representation of images and queries which may be performed with the system of FIG. 1 is shown. The method begins at S100.

At S102, color name representations 54 for a predefined set of color names are generated by the color name representation generation component 62. With reference also to FIG. 3, S102 may include synthesizing an LCN descriptor 82 for each of the color names in the set of color names (S104) with the LCN descriptor synthesizer 80 and embedding each color name's LCN descriptor 82 in the multidimensional feature space (S106) with the embedding component 84, using the second embedding function. Each of the resulting embedded color name LCN descriptors 86 may be power and/or L2 normalized by the embedding component 76 to generate the resulting color name representation 54 for each color name (S108). For example, for the color name "red", which corresponds to the ninth element in the illustrated 11-element synthesized color name descriptor for that color, has an LCN descriptor represented as a vector as follows: (0,0,0,0,0,0,0,0,1,0,0), i.e., all values are 0 except the one corresponding to the color name. This gives a single embedded vector 86 when embedded.

Figure 4:
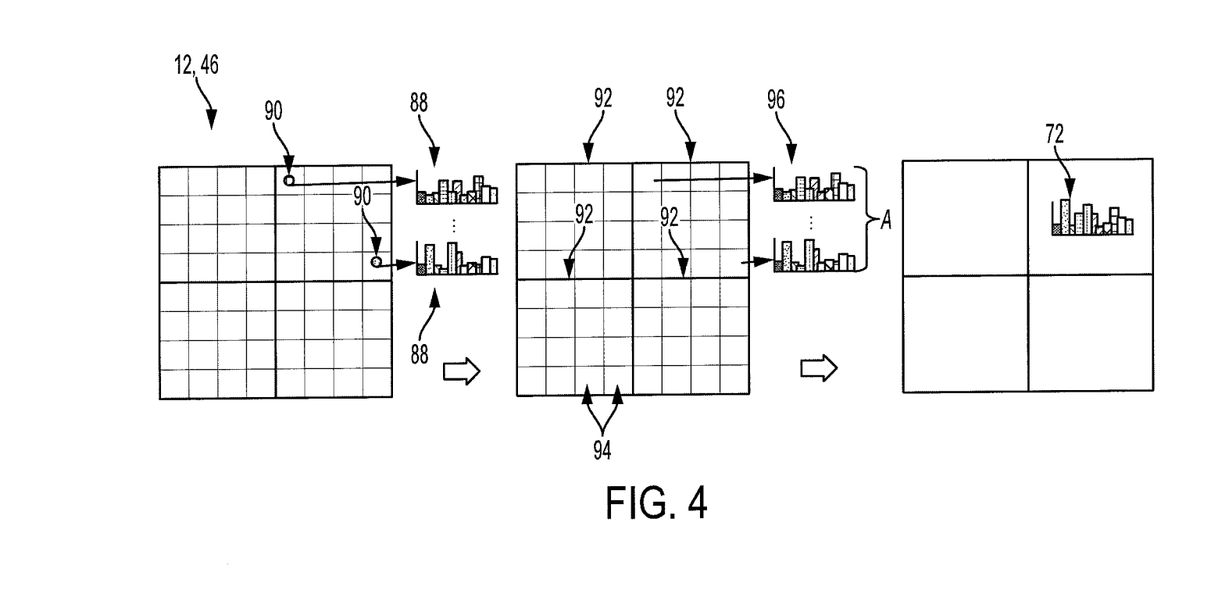
FIG. 4 schematically illustrates generating a color name representation of an image patch.

At S110, a reference image representation 56 is generated for each of the reference images 12 by the image representation generation component 60. Prior to generating the representation, the pixel resolution may be reduced, e.g., to 100,000 pixels or less. With reference also to FIGS. 3 and 4, S110 may include the following substeps S112-S122:

At S112, a probability distribution 88 over the set of color names is computed for each pixel 90 of the reference image 12 by the LCN descriptor extractor 70 (the pixel resolution of the image may be reduced prior to this step for ease of computation). The probability distribution may thus include for each color name in the set of color names, a value. Each of the values in the probability distribution may sum to a fixed value, such as 1. Thus, for example, an LCN pixel descriptor 88 could be represented as a vector as follows: (0.1,0.25,0.35,0.2,0.1,0.0,0,0.0,0.0,0.0,0.0), i.e., where at least one or, more commonly, at least two of the color name values in the probability distribution is/are non-zero.

At S114, a set of patches 92 is extracted from the reference image, e.g., on a densely overlapping grid at multiple scales, by a patch extractor of the image representation generation component 60. Each patch is tiled into a set of non-overlapping cells 94 (FIG. 4). While in the illustrated embodiment, only 4 patches are shown, it is to be appreciated that there may be a larger number of patches, such as at least 8, or at least 16, or at least 32, or at least 64, or at least 128, or at least 256, or at least 512 patches in an image. Additionally, while each patch is illustrated as being tiled into 16 cells there may be a different number of cells in each patch, such as at least 4, or at least 16, or at least 32, or at least 64, or at least 128 cells per patch. Each cell can include at least 4, or at least 16, or at least 32, or at least 64 pixels.

At S116, the probability distributions of the pixels in each cell 94 of the reference image are aggregated to form a cell-level representation 96.

Then at S118, the cell-level representations are aggregated (e.g., concatenated or summed) at the patch-level (by the LCN descriptor extractor 70), thus leading to one LCN descriptor 72 per patch 92. Concatenation allows spatial information to be incorporated into the patch descriptor.

At S120 each patch LCN descriptor 72 is embedded in a higher-dimensional space using the second embedding function, by the image embedding component 76.

At S122, the embedded patch descriptors 78 generated at S120 are aggregated and normalized to produce the final reference image representation 56. These may be indexed in memory with an image identifier for the corresponding reference image 12.

At S124, the system responds to a query. This includes, at S126, receiving a query 42. If the query includes a color name, then at S128, the color name representation 54 corresponding to the color name 47 is retrieved using the color name index. If the query includes a query image 46, then at S130, an image representation 52 corresponding to the query image 46 is generated by the image representation generation component 60. This can be performed in exactly the same manner as the generation of the reference image representations 56 (S110) except that there is no need to index the resulting image representation.

At S132 a similarity (such as the Euclidean distance or cosine similarity) is computed between the color name representation 54 corresponding to the color name 47 in the query (if there is one) and the reference image representations 56 of at least a subset of the reference images 12, by the comparison component 64. Similarly, a similarity (such as the Euclidean distance or cosine similarity) is computed between the query image representation 52 corresponding to the color name 47 in the query (if there is one) and the reference image representations 56 of at least a subset of the reference images 12.

At S134, based on the computed similarities, a subset of the reference images is identified, such as the top-K most similar images, where k can be, for example, at least 1 or at least 2, and/or the images which exceed a threshold (aggregated) similarities.

If there are two (or more) computed similarity scores (for a color name(s) and/or image), the scores for each reference image may be aggregated (e.g., averaged) to generate an aggregated similarity value before identifying the top-k reference images. In other embodiments, the query image representation 52 and color name representation 54 may be aggregated prior to performing the similarity comparison with the aggregated representation.

Information 50 based on the similarity computation is output by the output component. This may include the most similar Image(s), product names corresponding to these images, an automatically generated order for more product if the query image is not found, or the like.

The method ends at S136.

Further details on the system and method will now be provided.

Color Names

The local color name (LCN) based descriptors allow performing both color name ($q_{cn}$) and image-based ($q_{img}$) queries in the same high-dimensional feature space, when used in combination with discriminative embedding functions denoted $\Psi_{lcn}(q_{cn})$ and $\Phi_{lcn}(q_{img})$, respectively, which embed images and color names in the same space. For images, the system uses color names to provide a compact representation of the color information in a local image patch. While several methods exist for choosing a set of color names, in one embodiment, a limited set of at least four, or at least eight color names, such as up to twenty natural language color names is used. As an example, the eleven basic color names: black, brown, blue, grey, green, orange, pink, purple, red, white, and yellow described in Berlin, et al., "Basic color terms: their universality and evolution," University of California Berkeley, 1969, are used. These eleven color names are considered to be the largest set of unambiguous color names in the English language, and to span many cultures. Each color name 47 is thus found in most or all dictionaries for a given natural language, such as English or German. Systems for different languages may use the relevant color names for the respective language, while the same set of color name representations 54 is used (and same set of features for color name descriptors and pixel/patch descriptors). Using only eleven color names results in a compact and discriminative representation, which is particularly suited to describing man-made objects which are painted/colored with human-nameable colors.

This provides a system for object retrieval which enables querying by image, by color name or jointly by image and color name and which involves embedding images and color names in the same space by using common Local Color Name (LCN) descriptors.

Images

Images 46, 12 may be received by the system in any convenient file format, such as JPEG, GIF, JBIG, BMP, TIFF, or the like or other common file format used for images and which may optionally be converted to another suitable format prior to processing. The images can be input from any suitable image source, such as a camera, workstation, database, memory storage device, such as a disk, or the like. There may be 5, 10, 20, 50, or more reference images, each of a different product and in some cases, the same product may be shown in two or more of the reference images, e.g., from different angles and/or captured under different lighting conditions.

In general, each input digital image includes image data for an array of pixels forming the image. The image data may include colorant values, such as grayscale values, for each of a set of color separations, such as L*a*b* or RGB, or be expressed in another color space in which different colors can be represented. In general, "grayscale" refers to the optical density value of any single color channel, however expressed (L*a*b*, RGB, YCbCr, etc.). The images can be still photographic images or video images.

Computing Pixel Probability Distributions (S112)

To determine the pixel probability distributions 88, a color name model generated by the method of Van De Weijer, et al., "Learning color names for real-world applications," *IEEE Trans. on Image Processing*, 18(7)1512-1523 (2009) can be used. This model is learned by performing pLSA on a document-word matrix, with the latent topics corresponding to color names. Each document in the matrix corresponds to an image, and each word corresponds to a bin in a 3-dimensional color histogram in a suitable three dimensional color space, such as the CIELab color space. The topic-word matrix resulting from the matrix decomposition gives a probability of each word (i.e., color bin) being generated by each topic (i.e., color name).

For each pixel r in the image, its bin $w_r$ in the 3-dimensional color histogram is identified, based on its Lab values. Then its probability of belonging to each color name c in the set of color names is defined as follows:

$$p(c|r) \approx p(c|w_r) \quad (1)$$

where $p(c|w_r)$ is obtained from the topic-word matrix. Precomputed values for a set of colors in the Lab space may be stored in memory.

Computing Cell-Level LCN Descriptors (S116)

To introduce information about the local colors' geometric distribution, rather than constructing one descriptor per patch based on the pixel probabilities, the patch may be divided into an R×R grid of cells and one local descriptor is generated per cell. For example, R is at least 2 or at least 3, such as up to 10, e.g., R=4.

Accordingly, in the exemplary embodiment, color name probability distributions 88 are obtained for each pixel 90, as described above, and these distributions are aggregated for each cell 94 using an aggregating function A( ), e.g., the max pooling function, over each color name. This gives a cell representation vector 96, denoted $a_i$, of the same length as the pixel color name probability distributions 88 (FIG. 4).

The descriptor $a_x$ for a cell y is then $[a_1, \ldots, a_C]$, where C is the number of color names, e.g., 11, and $a_i$ is defined as:

$$a_i = \max_{r \in y} p(c_i|r) \quad (2)$$

The process is repeated for each cell 94, and the cell descriptors are aggregated over the cells of a patch (e.g., by concatenating the cell descriptors) to produce the final patch LCN descriptor 72 (S118).

Note that in this embodiment, rather than using sum aggregation as is standard practice, $a_i$ is computed with max pooling aggregation, which was found to be superior in initial experiments. This performance increase is likely due to the correction of local color burstiness, a phenomenon in which the colors in local patches which are very frequent dominate the final descriptor, and fine-grained local color variations are not well-captured (see, Jégou, et al., "On the burstiness of visual elements," *CVPR*, 1169-1176 (2009)).

In the max pooling method, the maximum value for each color name is identified from the LCN descriptors for the cell. This gives a cell-level LCN representation 96 which is the same length as the number of color names in the set of color names. Max pooling is described, for example, in Y.-L. Boureau, et al., "A theoretical analysis of feature pooling in visual recognition," ICML 2010. Other pooling methods can be employed such as averaging the values for each color name, or using the method described in U.S. application Ser. No. 14/141,612, filed Dec. 27, 2013, entitled WEIGHTING SCHEME FOR POOLING IMAGE DESCRIPTORS, by Naila Murray, et al., the disclosure of which is incorporated herein by reference in its entirety.

In other embodiments, Eqn. 2 may be computed on a patch level, rather than on a per cell level.

Patch Descriptors Based on LCN (S118)

Given an image I, such as a reference image or query image, a set of LCN descriptors 72 $\{a_x, x \in I\}$ is extracted from local patches x on a dense overlapping grid at multiple scales. In this step, the cell-level descriptors 96 generated as described for S116, are aggregated, e.g., concatenated, to produce an R×R×C Local Color Name (LCN) descriptor 72 for the patch, as illustrated in FIGS. 3 and 4, where C is the number of color names.

Each local image patch 92 is thus described based on the probability of pixels in that patch being labeled with a given color name.

Thus, in contrast to existing methods, which describe image colors non-locally and with one color name, colors are described locally using color probability distributions. The color names have terms in natural language and the patch descriptor 72 includes geometric information introduced by using a grid structure to extract color name distributions.

Embedding of Patch Descriptors (S120)

In this step, each of the local patch descriptors 72 is mapped to the high-dimensional feature space using the second embedding function $\phi$. In one embodiment $\phi$ may be the explicit embedding of the Fisher kernel, termed a Fisher vector (FV). Briefly, the FV involves computing the gradient of the log-likelihood of a descriptor with respect to the parameters of the underlying generative model, such as a Gaussian Mixture Model (GMM). The Gaussian mixture model includes a set of Gaussian functions, from which all the local descriptors are presumed to be emitted. Each Gaussian function can be represented by a set of parameters which include the mean vector and covariance matrix. Each local descriptor can thus be characterized by a vector of weights, one for each considered parameter of each Gaussian function. For example, there may be at least 16, or at least 32, or at least 64, or at least 128, or at least 512 Gaussians in the GMM. It can be assumed that the covariance matrices are diagonal. See, for example, Sanchez, Jorge et al., "Image classification with the Fisher vector: Theory and practice," IJCV, 105(3):222-245 (2013); Jorge Sanchez, and Thomas Mensink, "Improving the fisher kernel for large-scale image classification," Proc. 11th European Conference on Computer Vision (ECCV): Part IV, pp. 143-156

(2010); Jorge Sanchez and Florent Perronnin, "High-dimensional signature compression for large-scale image classification," in CVPR 2011; Perronnin, et al., "Fisher kernels on visual vocabularies for image categorization" in CVPR (2007); U.S. Pub. Nos. 20120076401 and 20120045134, the disclosures of which are incorporated herein by reference in their entireties. The trained GMM is intended to describe the content of any image within a range of interest (for example, any store product if the range of interest is store products).

As an alternative to the Fisher Vector, other embedding functions may be used, such as a bag-of-visual-words.

Generating Image Representation (S122)

Using FV embedding, the global representation for an image I is then the sum of, for all patches, the embedded patch descriptor 72:

$$\Sigma_{x \in I} \phi(a_x) \tag{3}$$

The dimensionality of the patch descriptors may be reduced, for example, by using Principal Component Analysis (PCA). This representation is can then be power- and $L_2$-normalized. For example the power a may be less than 1, such as 0.001-0.2, e.g., 0.1.

When the embedding function is the Fisher vector, a suitable similarity measure is the dot product. To measure the similarity between two images (S132), the dot-product between their representations is computed.

Other embedding methods are described, for example, in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120143853; 20120158739; 20120163715; 20130159292; 20140229160; and 20140270350.

Color Name Embedding (S102)

The goal is to embed colors in the same high dimensional feature space that is used to embed images. Such an embedding may be difficult if, as local descriptors, standard color descriptors, such as the Local Color Statistics (LCS) were used, as described in S. Clinchant, et al., "XRCE participation to ImageEval," *ImageEval Workshop at CVIR*, 2007. However, with LCN descriptors, synthesizing a color name representation corresponding to such a query can more readily be performed, as described with reference to FIG. 3. The color name is first represented as a C-dimensional binary color histogram with a one at the index of the queried color name. Replications of this C-dimensional histogram are concatenated together (as many copies as there are cells in the grid of the LCN image patch descriptor, i.e., R×R) in order to ensure consistency with the LCN image patch descriptor. A FV representation of this histogram is then generated, using the same PCA and GMM used to embed the images. The FV may then be power-normalized and L2-normalized to obtain the final embedding 54. This color name FV 54 can then be used to retrieve relevant database items by first computing and then sorting by the dot-product similarity between the query FV 54 and reference image FV 56 in the database.

Encoding the binary color name histogram as a FV allows mapping the 11-dimensional color name representation to a higher-dimensional and more discriminative space in which both color names and image texture is represented. As will be appreciated, the FV for each color query need only be generated and stored once. Additionally, generating the FV is fast as it involves encoding a single descriptor.

Because the 11 basic color names are generally considered to be the largest unambiguous set of colors in the English language (Berlin 1969), more exotic color names, for example "cerulean blue," can be well-approximated using a more basic term. For most applications however, the 11 basic terms should be sufficient for exploring a database by color.

Using Image and Color Name Representations for Querying (S132)

The query can include a color name an image, or a mixture or multiple thereof.

For example, it may be useful to combine two color names to form a QBCN. In this case, if it is desirable that one color name be associated with one region of a retrieved reference image, then spatial information may be provided, such as "top" or "bottom." The reference image representations 56 are then split by region and each part is queried with a respective embedded color name descriptor 54.

It can sometimes be useful to search the database with a query that combines the QBE and QBCN aspects, for example, to search for a product that that is similar to a given query product image but which exhibits a somewhat different color. For example, the results of color name and image queries are combined in a weighted combination (e.g., giving equal weight to each).

Let $\Phi_{lcn}$ denote the embedding function that takes as input an image and outputs a representation $\Phi_{lcn}(q_{img})$. Let $\Psi_{lcn}$ denote the embedding function that takes as input a color name and outputs a representation $\Psi_{lcn}(q_{cn})$. Then given a query image $q_{img}$ 46 and a query color name $q_{cn}$ 47, their embeddings $\Phi_{lcn}(q_{img})$ and $\Psi_{lcn}(q_{cn})$ can be computed and the embeddings combined into a joint query:

$$\beta \Phi_{lcn}(q_{img}) + (1-\beta) \Psi_{lcn}(q_{cn}) \tag{4}$$

where $\beta, 0 < \beta < 1$ is a parameter that strikes a balance between the two representations. It is possible to perform such a combination because $\Phi_{lcn}(q_{img})$ and $\Psi_{lcn}(q_{cn})$ lie in the same space. Consequently, the similarity with a reference image $d_{img}$ whose embedding is denoted $\Phi_{lcn}(d_{img})$ is computed with the dot-product as:

$$(\beta \Phi_{lcn}(q_{img}) + (1-\beta) \Psi_{lcn}(q_{cn}))(\Phi_{lcn}(d_{img})) \tag{5}$$

which can be rewritten as:

$$\beta(\Phi_{lcn}(q_{img})'\Phi_{lcn}(d_{img})) + (1-\beta)(\Psi_{lcn}(q_{cn})'\Phi_{lcn}(d_{img})) \tag{6}$$

This can be understood as the linear combination of the scores of the QBE and QBCN queries. Note that other combination schemes could be considered, for example, product combinations, such as:

$$(\Phi_{lcn}(q_{img})'\Phi_{lcn}(d_{img}))^{\beta}(\Psi_{lcn}(q_{cn})'\Phi_{lcn}(d_{img}))^{1-\beta} \tag{7}$$

where, again, $\beta$ is a parameter that strikes a balance between the QBE and QBCN objectives. For the QBE part (the first part in the above equation), other embedding functions than $\Phi_{lcn}$ could be used, for example, an embedding $\Phi_{sift}$, based on local SIFT descriptors (see, Lowe, D. G., "Object recognition from local scale-invariant features," *ICCV*, vol. 2, pp. 1150-1157 (1999)). In such a case, the similarity can be written as:

$$(\Phi_{sift}(q_{img})'\Phi_{sift}(d_{img}))^{\beta}(\Psi_{lcn}(q_{cn})'\Phi_{lcn}(d_{img}))^{1-\beta} \tag{8}$$

Color is a useful recognition cue in several domains such as product detection for retail applications, where the goal is to be able to recognize very similar products which can only be distinguished accurately by comparing their color content. Another application is in reidentification of vehicles or pedestrians. For vehicles, a color name for the vehicle can be combined with an image for reidentifying a vehicle, e.g., in a parking garage or at different toll booths. For pedestrians, matching clothing by color adds useful information in reidentification of a pedestrian, e.g., in a sequence of video images.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer, (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Without intending to limit the scope of the exemplary embodiment, the following examples demonstrate application of the method to grocery items.

EXAMPLES

Images in a database are resized to (approximately) 100K pixels while keeping their original aspect ratio. When using LCN descriptors to represent an image, patch descriptors are extracted from 24×24 patches on dense grids every 4 pixels at 5 scales. Dimensionality of the descriptors is reduced by using a 64-dimension PCA. After computing the FV representation, power-normalization with $\alpha=0.1$ is applied, followed by $L_2$ normalization. Setting $\alpha=0.1$ was found to be beneficial for LCN descriptors. The number of Gaussian mixture model components is set by cross-validation and is dataset-dependent, ranging from 16 to 512.

The performance of the exemplary embeddings is evaluated both quantitatively and qualitatively in three applications: product detection, query-by-color, and joint product-color queries.

1. Product Detection with Color Verification

The problem of product detection involves detecting and localizing instances of a query product in an image, in a query-by-example paradigm, i.e., where an image of the query is used to retrieve relevant items in the database. Above-mentioned U.S. application Ser. No. 14/557,677 describes a method for product detection, in which candidate image windows which potentially contain the query product are generated using a matching method. These candidate windows are then reranked using a verification step. The verification entails generating the FVs for the query image and the candidate windows, and then reranking them based on the cosine similarity between their FVs.

In an exemplary embodiment, the embedding $\Phi_{lcn}$ be used to add a color-based verification to that system. After a set of candidate windows are returned by the matching step, FVs are extracted from these candidate windows using both SIFT-based and LCN-based descriptors. The matching scores between a query and a candidate window can then be the cosine similarity between their FVs. The SIFT and LCN-based scores are combined using weights, which can be set by cross-validation. When computing the SIFT-based FVs, the settings used in Ser. No. 14/557,677 can be used, which are generally the same settings used for LCN. However, it is beneficial to encode some image layout information through a spatial pyramid approach, by concatenating FVs extracted from the whole image, its four quadrants and three equally-sized horizontal image strips.

Figure 5:
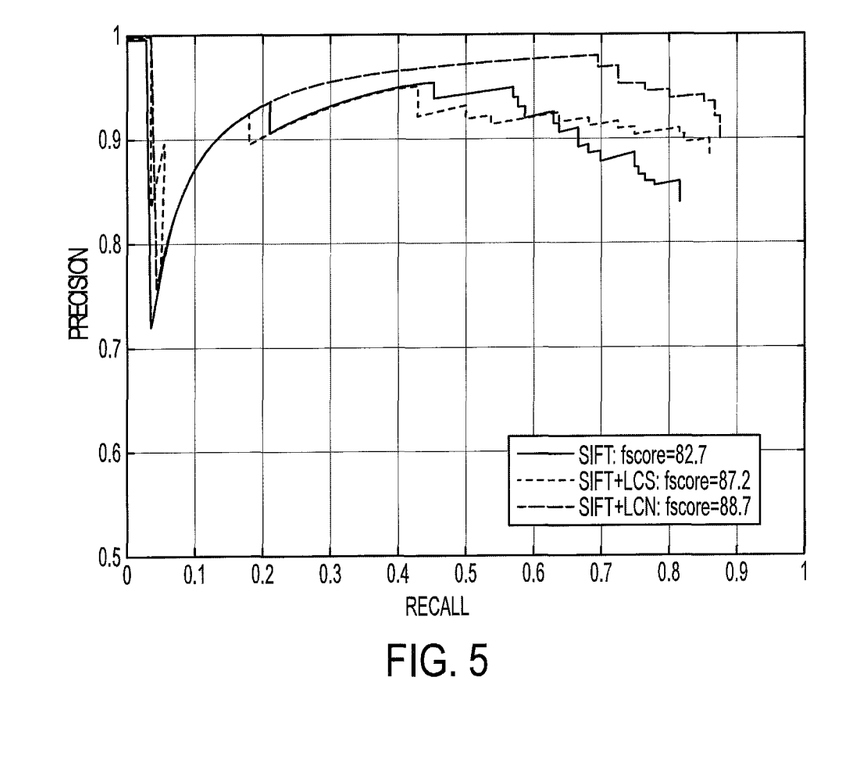
FIG. 5 is a precision recall plot for three representation generation methods on a first dataset.
Figure 6:
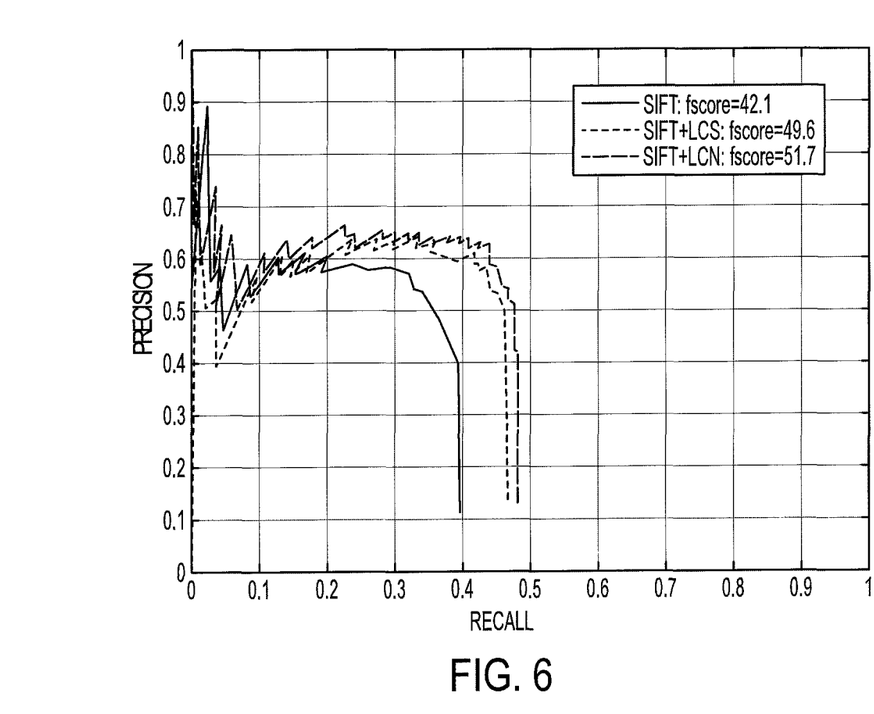
FIG. 6 is a precision recall plot for three representation generation methods on a second dataset.

The present method with the standard color descriptors is compared to the performance of LCS descriptors (S. Clinchant, et al., "XRCE participation to ImageEval," *ImageEval Workshop at CVIR*, 2007). Two retail product databases were used in the evaluation. The databases are made up of reference images of products, and shelf images within which searches for instances of products can be performed. Database A contains separate images of 46 reference products (i.e., 46 potential queries) and 193 product instances all in in one image. Database B contains separate images of 207 reference products and 450 product instances in 10 images. As shown in FIGS. 5 and 6, which show product retrieval results for the two datasets, the exemplary descriptors are more complimentary with SIFT descriptors than with LCS descriptors, providing a bigger performance gain.

In addition to the retrieval experiments, classification experiments were performed on the CUB-2011 database of Wah, et al. "The Caltech-UCSD Birds-200-2011 Dataset," Technical report, CalTech, 2011, a fine-grained image dataset of bird species. It was found that LCN features also improved upon the performance of LCS features for this task (19.3% mean AP, vs. 17.9). This shows the general applicability of the LCN embedding function $\Phi_{lcn}$.

2. Querying by Color Name

LCN-based representations were generated for all database images and color query representations were synthesized, as described above. The database images are ranked by the cosine similarity of their representation to the query representation. As no ground-truth annotations are available, qualitative retrieval-by-color results were evaluated on two retail product databases: grocery store products and shoes. The grocery database contains cropped images of 253 reference products. The shoes database contains 8144 cropped images of shoes of different brands and models. Results were also obtained for a cars dataset, which contains 3511 cropped images of different cars.

For all datasets, the top-ranked candidates are in general very relevant to the query color. For queries with very dominant colors, the top-ranked candidates are particularly relevant. Such candidates are more plentiful in the two latter two datasets. Failure cases occur mainly for images with low illumination, or with a non-white illuminant or color cast. These may be corrected by incorporating a color constancy component (for example, using the methods of Gijsenij, et al., "Computational color constancy: Survey and experiments," IEEE TIP, 20(9):247-2489 (2011) or Vazquez-Corral, et al., "Color constancy by category correlation," IEEE TIP, 21(4):1997-2007 (2012).

3. Joint Object-Color Queries

A user may also want to query a database for items similar to a specific object, but with a different color, for example a grocery store product but in a different color from the predominant color of the grocery store product (e.g., purple in combination of a grocery store product which appears predominantly red or white or blue). To perform such a query the approach described above, and more precisely, by using equation (8). The qualitative results obtained included the top 3 results on joint queries for a selection of objects and colors. The objects selected were those with similar objects (in terms of general appearance and color) in the database. It could be seen from the results that relevant images, i.e., those that are similar to the query object but with a different dominant color, tend to be among the first few returned candidates.

The results suggest that aggregated local color name descriptors are useful for fine-grained retrieval and natural language color queries.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A retrieval method comprising:
a) for each of at least one reference image, providing a reference image representation which has been generated by embedding color name descriptors for patches of the reference image into a feature space, each color name descriptor including an element for each of the color names in the set of color names;
b) for each of at least one color name in a set of color names, providing a color name representation which has been generated by embedding a synthesized color name descriptor in the same feature space as the reference images, each synthesized color name descriptor including an element for each of the color names in the set of color names, each embedded synthesized color name descriptor having a same number of dimensions as each of the reference image representations;
c) receiving a query comprising at least one of:
a color name selected from the set of color names, and a query image;
d) for a query which includes a color name, retrieving the respective color name representation;
e) for a query which includes a query image, providing a query image representation which has been generated by embedding color name descriptors for the query image in the multidimensional feature space;
f) computing a similarity between:
at least one of the at least one reference image representations, and
at least one of the color name representation and the query image representation; and
g) outputting information based on the computed similarity,
wherein at least one of a), b), c), d), e), f), and g) is performed with a processor.

2. The method of claim 1, wherein the provided color name representation has been generated by:
synthesizing a local color name descriptor;
generating a color name representation comprising embedding the synthesized local color name descriptor with a first embedding function.

3. The method of claim 2, wherein the synthesized local color name descriptor includes a non-zero value for only one of a plurality of elements, each element corresponding to a color name in the set of color names.

4. The method of claim 2, wherein the first embedding function is a Fisher Vector embedding function.

5. The method of claim 1, wherein the provided reference image representation has been generated by:
assigning to each of a set of pixels of the reference image, a probability distribution over a predefined set of color names;
for each of a plurality of patches of the reference image:
generating a local color name descriptor, comprising aggregating the pixel probability distributions, and
generating an embedded patch descriptor comprising embedding the local color name descriptor with a second embedding function; and
generating the reference image representation, comprising aggregating the embedded patch descriptors.

6. The method of claim 5, wherein the second embedding function is a Fisher Vector embedding function.

7. The method of claim 5, wherein the reference image representation has been generated by:
defining a plurality of patches of the reference image, each patch including a plurality of cells;
for pixels of each cell aggregating the pixel probability distributions; and
for each of the plurality of patches of the reference image, generating the local color name descriptor, comprising concatenating the aggregated pixel probability distributions of the cells in the patch.

8. The method of claim 1, wherein the query includes a query image and the generating of the query image representation comprises:
assigning to each of a set of pixels of the query image, a probability distribution over the set of color names;
for each of a plurality of patches of the query image:
generating a local color name descriptor, comprising aggregating the pixel probability distributions, and
generating an embedded patch descriptor comprising embedding the local color name descriptor with a second embedding function; and
generating a query image representation, comprising aggregating the embedded patch descriptors.

9. The method of claim 8, wherein the query image representation is generated by:
defining a plurality of patches of the query image, each patch including a plurality of cells;
for each cell, aggregating the pixel probability distributions of the pixels of the cell; and
for each of the plurality of patches of the query image, generating the local color name descriptor, comprising concatenating the aggregated pixel probability distributions of the cells in the respective patch.

10. The method of claim 9, wherein the aggregating of the pixel probability distributions is performed by max pooling aggregation.

11. The method of claim 1, wherein the reference image comprises a plurality of reference images.

12. The method of claim 1, wherein the at least one color name includes at least four color names.

13. The method of claim 1, wherein the at least one color name includes no more than twenty color names.

14. The method of claim 1, wherein the received query includes a color name and the similarity is computed based on the color name representation.

15. The method of claim 14, wherein the received query further includes a query image, and the similarity is computed based on the query image representation and the color name representation.

16. The method of claim 1, wherein the computing of the similarity comprises computing a cosine similarity between the at least one of the at least one reference image representation, and the at least one of the color name representation and the query image representation.

17. A computer program product comprising non-transitory memory storing instructions which when executed by a computer, perform the method of claim 1.

18. A system comprising memory which stores instructions for performing the method of claim 1 and a processor in communication with the memory for executing the instructions.

19. A retrieval method comprising:
a) for each of at least one reference image, providing a reference image representation which has been generated by embedding color name descriptors for the reference image in a feature space;
b) for each of at least one color name in a set of color names, providing a color name representation which has been generated by embedding a synthesized color name descriptor in the same feature space as the embedded color name descriptors of the reference image;
c) providing for receiving a query comprising at least one of:
a color name selected from the set of color names, and
a query image;
d) for a query which includes a color name, retrieving the respective color name representation;
e) for a query which includes a query image, providing a query image representation which has been generated by embedding color name descriptors for the query image in the feature space;
f) computing a similarity between:
at least one of the at least one reference image representations, and
at least one of the color name representation and the query image representation,
wherein when the received query includes both a color name selected from the set of color names and a query image, the similarity is computed based on the query image representation and the color name representation; and
g) outputting information based on the computed similarity,
wherein at least one of a), b), c), d), e), f), and g) is performed with a processor.

20. A system comprising:
an image representation generation component which generates representations of images by embedding color name descriptors for the image in a feature space;
memory which stores a color name representation for each of a set of color names, generated by embedding a synthesized color name descriptor in the feature space into which the images are embedded, the embedded synthesized color name descriptor having a same number of dimensions as each of the image representations;
a comparison component which receives a query comprising at least one of a query image and one of the set of color names and computes a similarity between the query and at least one reference image, wherein in computing the similarity, the at least one reference image is embedded in the feature space and the at least one of the query image and one of the set of color names is embedded in the feature space, wherein when the query includes both a color name selected from the set of color names and a query image, the similarity is computed based on the query image representation and the color name representation;
an output component which outputs information based on the computed similarity; and
a processor which implements the image representation generation component, the comparison component, and the output component.

21. A method for generating a system for comparing images and color names in a common multidimensional feature space comprising:
for each of a set of color names, generating a color name representation in a multidimensional feature space, comprising:
synthesizing a local color name descriptor; and
generating a color name representation comprising embedding the synthesized local color name descriptor in a multidimensional feature space with a first embedding function;
for each of a set of reference images, generating a reference image representation in the same multidimensional feature space as the color name representations, comprising:
assigning to each of a set of pixels of the reference image, a probability distribution over a predefined set of color names;
for each of a plurality of patches of the reference image:
generating a local color name descriptor, comprising aggregating the pixel probability distributions, and
generating an embedded patch descriptor comprising embedding the local color name descriptor with a second embedding function; and
aggregating the embedded patch descriptors to generate the reference image representation;
storing the color name representations and reference image representations;
storing instructions for:
receiving a query comprising at least one of:
a color name selected from the set of color names, and
a query image, and
computing a similarity between the query and at least one of the stored reference image representations, wherein in computing the similarity, the at least one of the query image and one of the set of color names is embedded in the multidimensional feature space; and wherein at least one of the generating of the color name representations and the generating of the reference image representations is performed with a processor.

* * * * *